United States Patent
Chau

(10) Patent No.: US 9,421,440 B1
(45) Date of Patent: Aug. 23, 2016

(54) TECHNOLOGIES FOR FLAGSTICK DISTANCE DETERMINATION

(71) Applicant: Hon Chau, San Jose, CA (US)

(72) Inventor: Hon Chau, San Jose, CA (US)

(*) Notice: Subject to any disclaimer, the term of this patent is extended or adjusted under 35 U.S.C. 154(b) by 166 days.

(21) Appl. No.: 14/309,037

(22) Filed: Jun. 19, 2014

Related U.S. Application Data

(60) Provisional application No. 61/843,485, filed on Jul. 8, 2013.

(51) Int. Cl.
*H04W 4/02* (2009.01)
*A63B 57/00* (2015.01)
*A63B 71/06* (2006.01)

(52) U.S. Cl.
CPC ............ *A63B 57/00* (2013.01); *A63B 71/0619* (2013.01); *A63B 2071/0691* (2013.01); *A63B 2220/13* (2013.01); *A63B 2220/14* (2013.01)

(58) Field of Classification Search
USPC ......................................... 473/407; 455/456.3
See application file for complete search history.

(56) References Cited

U.S. PATENT DOCUMENTS

| | | | |
|---|---|---|---|
| 6,236,360 B1 | 5/2001 | Rudow et al. | |
| 7,922,606 B2 | 4/2011 | Balardeta et al. | |
| 8,070,628 B2 | 12/2011 | Denton et al. | |
| 8,147,335 B2 | 4/2012 | Kim et al. | |
| 8,221,269 B2 | 7/2012 | Meadows et al. | |
| 2004/0073325 A1 | 4/2004 | Reeves | |
| 2007/0099715 A1 | 5/2007 | Jones et al. | |
| 2014/0274155 A1* | 9/2014 | Langberg | H04W 4/02 455/456.3 |

OTHER PUBLICATIONS

GPS Industries, LLC; Who we are/Deliver a Golf Experience like no other; Website; Jun. 17, 2014; 2 Pages; http://www.gpsindustries.com/.

\* cited by examiner

*Primary Examiner* — Pierre E Elisca
(74) *Attorney, Agent, or Firm* — Goldstein Law Offices, P.C.

(57) ABSTRACT

A system is provided. The system includes a golf course operator mobile computing device located within a golf course. The operator device obtaining a geolocation of a flagstick positioned for golf gameplay within the course. The system further includes a computer system receiving the flagstick geolocation from the operator device. The system also includes a golfer mobile computing device located within the course. The golfer device obtaining a golfer device current geolocation. The golfer device receiving the flagstick geolocation from the computer system. The golfer device determining a distance between the golfer device and the flagstick based on the golfer device current geolocation and the flagstick geolocation. The golfer device disclosing the distance.

13 Claims, 8 Drawing Sheets

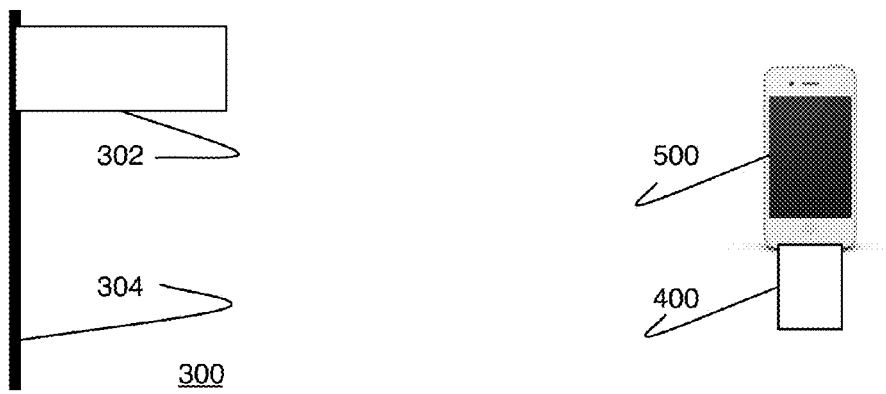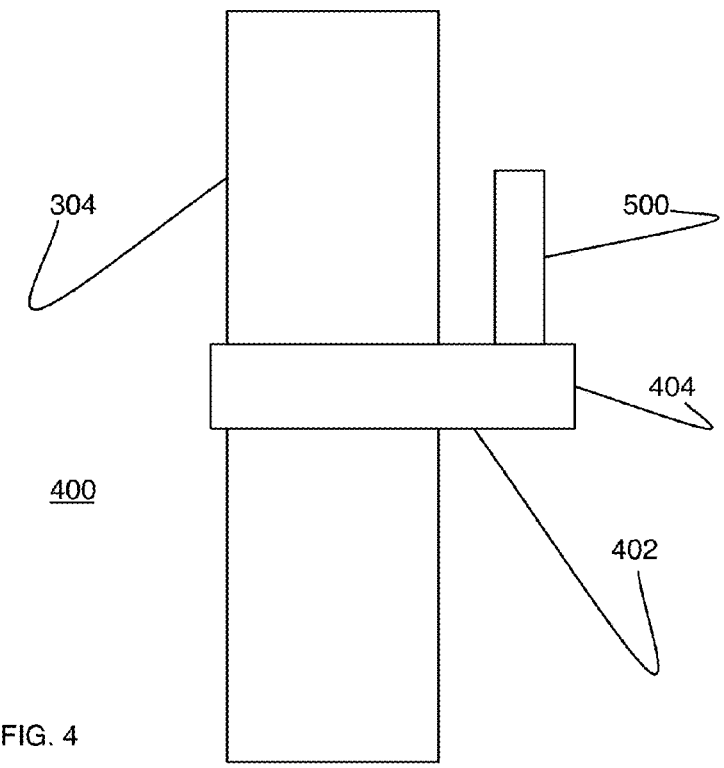

TECHNOLOGIES FOR FLAGSTICK DISTANCE DETERMINATION

CROSS-REFERENCE TO RELATED APPLICATIONS

The present application claims priority to U.S. Provisional Patent Application Ser. No. 61/843,485, filed on Jul. 8, 2013, which is herein fully incorporated by reference for all purposes.

TECHNICAL FIELD

Generally, the present disclosure relates to computing. More particularly, the present disclosure relates to golf.

BACKGROUND

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

A golf course is an area containing a plurality of holes for golf gameplay. The holes are often associated with a plurality of flagsticks, which can be positioned adjacent to the holes or positioned in the holes. The flagsticks are structured for visibility from afar.

At the course, a player usually attempts to strike a golf ball with a golf club into one of the holes, as visibly identified via one of the flagsticks associated therewith. Before such strike, the player usually desires to know how far the one of the holes is from the player's current location. Knowing such distance can be helpful in selecting proper golf club, golf ball, swing posture and/or swing type.

Such distance determination has been typically performed via the player observing the one of the flagsticks from the player's current location and mentally calculating a distance based at least in part on such personal observation. However, in recent years, due to advances in mobile technology, some players began to use rangefinders for such distance determination. Although somewhat helpful, the rangefinders are expensive to purchase and/or to maintain. Furthermore, some players object to bringing the rangefinders along due to potential interference with walking, rangefinder maintenance, such as lens cleaning and/or batteries, and in general, just extra equipment to think about.

Although some mobile device technologies have been devised for informing the player of the player's current location and where the golf course's boundaries are, no mobile device technologies are available to inform the player of how far the one of the flagsticks is from the player's current location, especially since flagstick placement changes periodically, such as on a daily basis. Further, although some golf cart technologies allow for informing the player of how far the one of the flagsticks is from the player's current position, such technologies require golf cart operation, which can be complex, unsafe, unavailable and/or costly to purchase and/or to maintain. Moreover, not all golf courses are equipped with golf carts. Additionally, the golf carts are not operable in all golf courses at all times, whether due to golf course terrain conditions, course restrictions and/or bad weather conditions. Furthermore, the player usually strikes the ball at a distance from the golf cart, which hinders relatively accurate flagstick distance determination. In addition, the player often lacks a direct line of sight to the one of the flagsticks, whether due to golf course terrain conditions and/or golf course restrictions. Such inability often impedes the player's ability to determine the one of the flagsticks distance and/or direction. Also, when the one of the flagsticks is far from the player such that the player strikes the ball several times to reach the green of the golf course, the player can have difficulty in strategical placement of the player's first few strikes due the player's lack of advanced knowledge of the golf course's layout.

While certain aspects of conventional technologies have been discussed to facilitate the present disclosure, no technical aspects are disclaimed. The claims may encompass at least one of the conventional technical aspects discussed herein.

BRIEF SUMMARY

The present disclosure addresses at least one of the above. However, the present disclosure may prove useful in addressing other problems and deficiencies in a number of technical areas. Therefore, the claims, as recited below, should not necessarily be construed as limited to addressing any of the particular problems or deficiencies discussed herein.

An example embodiment of the present disclosure provides a system. The system includes a golf course operator mobile computing device located within a golf course. The operator device obtaining a geolocation of a flagstick positioned for golf gameplay within the course. The system further includes a computer system receiving the flagstick geolocation from the operator device. The system also includes a golfer mobile computing device located within the course. The golfer device obtaining a golfer device current geolocation. The golfer device receiving the flagstick geolocation from the computer system. The golfer device determining a distance between the golfer device and the flagstick based on the golfer device current geolocation and the flagstick geolocation. The golfer device disclosing the distance.

Another example embodiment of the present disclosure provides a method for performance within a golf course. The method includes obtaining a geolocation of a flagstick positioned for golf gameplay within the course via a golf course operator mobile computing device. The method further includes sending the flagstick geolocation from the operator device to a computer system. The method also includes allowing a golfer mobile computing device to obtain a golfer device current geolocation, to receive the flagstick geolocation from the computer system, to determine a distance between the golfer device and the flagstick based on the golfer device current geolocation and the flagstick geolocation, and to disclose the distance.

The present disclosure may be embodied in the form illustrated in the accompanying drawings. Attention is called to the fact, however, that the drawings are illustrative. Variations are contemplated as being part of the disclosure, limited only by the scope of the claims. The above and other features, aspects and advantages of the present disclosure will become better understood to one skilled in the art with reference to the following drawings, detailed description and appended claims.

BRIEF DESCRIPTION OF THE DRAWINGS

The accompanying drawings illustrate example embodiments of the present disclosure. Such drawings are not to be construed as necessarily limiting the present disclosure. Like numbers and/or similar numbering scheme can refer to like and/or similar elements throughout.

FIG. 3 shows an example embodiment of a flagstick according to the present disclosure.

FIG. 4 shows an example embodiment of a flagstick cradle according to the present disclosure.

FIG. 5 shows an example embodiment of a mobile device cradle according to the present disclosure.

DETAILED DESCRIPTION OF THE PREFERRED EMBODIMENTS

Figure 1:
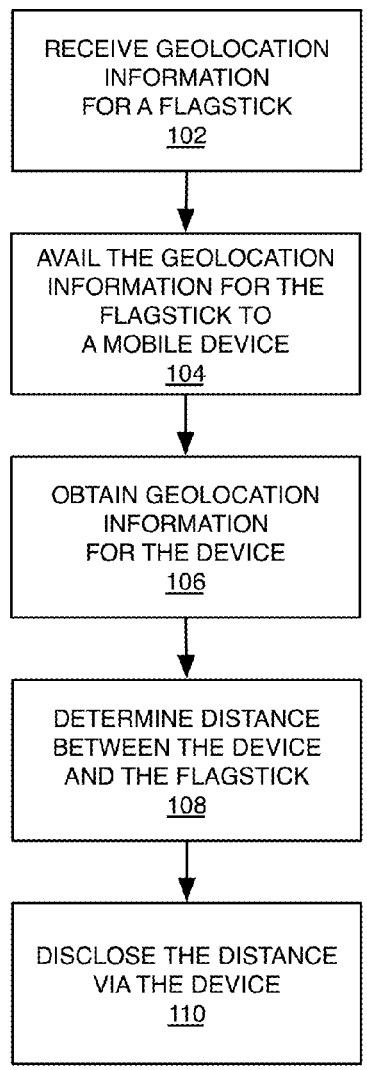
FIG. 1 shows a flowchart of an example embodiment of a process for flagstick distance determination according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cuffing, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible and/or any other combinations thereof. Any and/or all elements, as disclosed herein, can be identical and/or different from each other in material, shape, size and/or any dimension, such as length, width, height, depth, area, volume, breadth, density, temperature, resistance and so forth.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

As used herein, the term "about" and/or "substantially" refers to a +/−10% variation from the nominal value/term. Such variation is always included in any given value/term provided herein, whether or not such variation is specifically referred thereto.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

FIG. 1 shows a flowchart of an example embodiment of a process for flagstick distance determination according to the present disclosure.

A process 100 is used for flagstick distance determination. Process 100 includes a plurality of blocks 102-110, which can be performed manually and/or automatically, for free and/or for compensation, in realtime and/or in non-realtime, synchronous and/or asynchronous, serially and/or sequentially, by at least one entity, at least as described herein, in any manner.

Block 102 entails receiving geolocation information for a flagstick. The geolocation information for the flagstick includes data enabling identifying a geolocation of the flagstick. For example, the geolocation information for the flagstick can include a coordinate, such as at least one of a longitude and a latitude, whether the coordinate is global system based and/or specific area system based. At least a portion of the geolocation information for the flagstick can include multimedia, such as a video segment or an audio segment, and/or an interactive segment. The flagstick is positioned within a golf course, such as adjacent to a hole or within the hole. The hole can have a golf ball cup therein.

The receiving is performed based at least in part on identifying the geolocation information via a mobile computing device and communicating the identified geolocation information via the mobile device, for receipt via a computer system. The mobile device communicates with the computer system, whether directly and/or indirectly in any manner. Such communication can be wired and/or wireless in any manner. The mobile device can include a cell phone, whether a feature phone or a smartphone, a tablet computer, a wearable computer, such as via a watch, a glasses set, or a clothing item, a golf player equipment computer, a laptop computer, a computer terminal and so forth. Also, a vehicle, such as a golf cart or a flying drone, can be equipped with a computer thereby functioning as the mobile device. The mobile device functions based at least in part on logic, whether software and/or hardware based in any manner. The logic can include an operating system, a mobile software application, a web browser and so forth. The mobile software application can be available via an online app store, whether for free and/or for compensation, in any manner. Note that the mobile device can be encased in a case for mobile device protection.

The computer system includes at least one server, whether hardware and/or software based. The server can communicate with a database, such as a relational database. The database can be running on the server, local to the server or remote to the server. The receiving can be performed via the database. Note that the computer system can be accessed without user/device/software application authentication and/or with user/device/software application authentication in any manner. For example, the authentication can be based on at least in part on identifying textual information, passwords, completely automated public turing test to tell computers and humans apart (CAPTCHA), identity validation, biometrics, symbolical information and/or any other access control method. Note that the computer system can allow for at least partial anonymous and/or unidentifiable access. Note that the computer system can be encased for computer system protection.

The identifying is performed via a golf course operator, which includes at least one employee of an entity associated with operating, managing and/or owning the golf course. Alternatively, the golf course operator includes a third party acting on behalf of the golf course operator. For example, the golf course operator can include a golf course worker, a golf course manager, or an employee of a company hired by the golf course operator. The golf course operator operates the mobile device, whether directly and/or indirectly, whether wired and/wirelessly, whether personally and/or impersonally, manually and/or automatically, in any manner. For example, the identifying can include placing the mobile device next to the flagstick and saving the current geolocation, such as via the mobile software application, for communication to the computer system. Also, the identifying can include coupling a cradle to the mobile device and to the flagstick and saving the current geolocation for communication, such as via the mobile software application, to the computer system. Further, the identifying can include coupling the cradle to the flagstick and docking the mobile device into the cradle and saving the current geolocation, such as via the mobile software application, for communication to the computer system. Moreover, the identifying can include coupling a geolocation device, such as a global positioning system (GPS) receiver or a cell site signal triangulation based geolocator, to the flagstick and the mobile device and saving the current geolocation for communication, such as via the mobile software application, to the computer system. Additionally, the identifying can include selecting a flagstick location on a golf course grid displayed via a computer, which can include the mobile device, and saving the selected flagstick location for communication, such as via the mobile software application, to the computer system. Note that the computer system can be associated with and/or operated via the golf course operator and/or another entity allowing the golf course operator access to the computer system, whether for free and/or for compensation, in any manner. Also, note that in some example embodiments, the identifying and the communicating can be performed via a golf player. Further, note that in some example embodiments, the golf player can operate the computer system. Additionally, note that in some example embodiments, the geolocation information for the flagstick can be manually input into the mobile device and communicated to the computer system.

Block 104 entails availing the geolocation information for the flagstick to a mobile device. The geolocation information for the flagstick can be availed, such as via provision, offering, and/or presentation, in a format as originally received and/or identified. Alternatively, the geolocation information for the flagstick can be availed, such as via provision, offering, and/or presentation, in the format not as originally received and/or identified. For example, the geolocation information for the flagstick can be amended for user comprehension, compatibility, security, compression, integrity, communication and so forth. Such amended geolocation information can be abridged, encrypted, compressed, rewritten, reformatted, outlined, symbolized and so forth. Such amendment can be performed via the computer system.

The mobile device can communicate with the computer system, whether directly and/or indirectly in any manner. Such communication can be wired and/or wireless in any manner. The mobile device can include a cell phone, whether feature phone or a smartphone, a tablet computer, a wearable computer, such as via a watch or a clothing item, a golf player equipment computer, a laptop computer, a computer terminal and so forth. The mobile device functions based at least in part on logic, whether software and/or hardware based in any manner. The logic can include an operating system, a mobile software application, a web browser and so forth. The mobile software application can be available via an online app store, whether for free and/or for compensation, in any manner. Note that the mobile device can be operated via at least one of the golf player and the golf course operator. Also, note that the mobile device of block 102 can be identical to or different from the mobile device of block 104.

The availing can be performed in multiple ways. The availing can be performed based at least in part on any type of communication protocol, whether wired and/or wireless. The protocol can allow for availing via a cellular network, a Wi-Fi network, a short range wireless communication protocol, Ethernet, and so forth. The availing can be via a message, such as an intra-app message, an email message, a fax message, a chat message, a text message, a browser message, a voicemail message, a web interface message, a social network message and so forth. The availing can include sharing and/or offering of any type. The availing can include any form of access control granted to the mobile device to at least view at least a portion of the geolocation information for the flagstick. In some example embodiments, the availing can include offering the geolocation information for the flagstick for viewing in order to copy and paste, whether manually and/or automatically, in any manner. Yet in other example embodiments, the availing can include offering for downloading the geolocation information for the flagstick, whether manually and/or automatically, in any manner.

Block 106 entails obtaining geolocation information for the mobile device. The geolocation information for the mobile device includes data enabling identifying a geolocation of the mobile device. For example, the geolocation information for the mobile device can include a coordinate, such as at least one of longitude and latitude, whether the coordinate is global system based and/or specific area system based. The geolocation information for the mobile device can be obtained via GPS technology with which the mobile device is equipped, via signal triangulation technology of signals emitted via the mobile device and/or any other geolocation determination technology. At least a portion of the geolocation information for the mobile device can include multimedia, such as a video segment or an audio segment, and/or an interactive segment. The mobile device can be stationed anywhere, such as within a golf course. The mobile device can be operated via at least one of the golf player and the golf course operator. Note that the mobile device can be operated via at least one of the golf player and the golf course operator.

Block 108 entails determining distance between the device and the flagstick. The distance is determined based at least in part on the geolocation information for the mobile device, as obtained via block 106, and the geolocation information for the flagstick, as obtained via at least one of block 102 and block 104. The distance can be determined via at least one of the mobile device and the computer system. The distance can be determined via any known method. The distance can be determined via any system of measurement, such as a metric system. Such distance determination can also include direction determination via any known method in any system of measurement. The distance and/or the direction can be converted from any and/or into any system of measurement. The distance and/or direction can be accurate within any margin of error. For example, margin of error can be any margin between about 0% and about 10%. Note that the mobile device can be operated via at least one of the golf player and the golf course operator.

Block 110 entails disclosing the distance via the mobile device. The distance can be disclosed in any known manner. For example, the disclosure can be visual, auditory, tactile, feedback based, web based, app based, text message based, email based, fax based, chat based, social network based, voicemail based, and so forth. When the disclosure is visual, the disclosure can employ any element and/or any type of a graphical user interface (GUI). The disclosure can be via availing, providing, offering, and/or presenting, in a format as determined in advance. Alternatively, the disclosure can be via availing, providing, offering, and/or presenting, in a format as determined dynamically. For example, the disclosure can be amended for user comprehension, compatibility, security, compression, integrity, communication and so forth. Such disclosure can be abridged, encrypted, compressed, rewritten, reformatted, outlined, symbolized and so forth. Such amendment can be performed via at least one of the computer system and the mobile device. Note that the mobile device can be operated via at least one of the golf player and the golf course operator.

Figure 2:
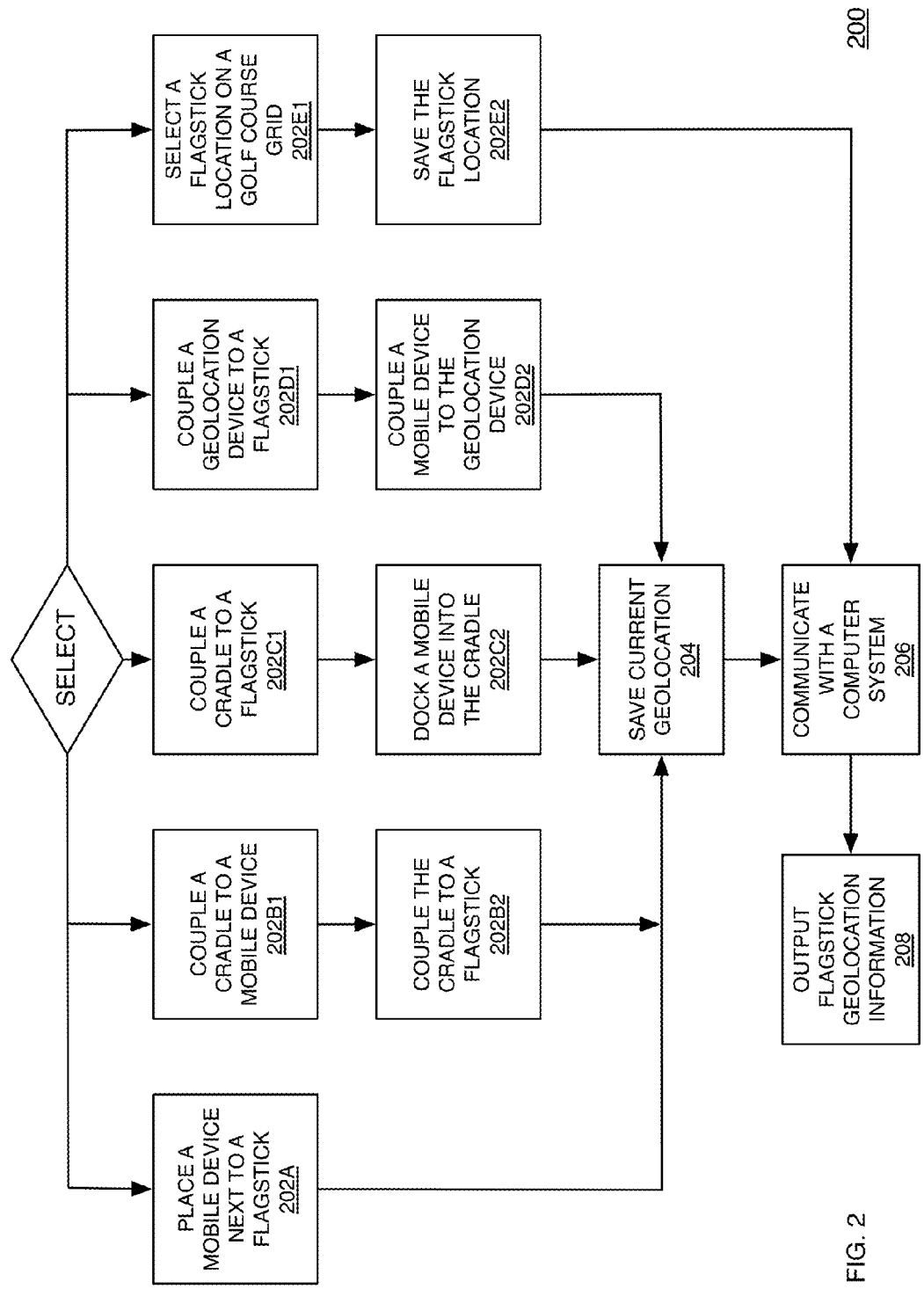
FIG. 2 shows a flowchart of an example embodiment of a process of communicating flagstick location according to the present disclosure.

FIG. 2 shows a flowchart of an example embodiment of a process of communicating flagstick location according to the present disclosure. Some concepts depicted in this figure are described above. Thus, same reference characters identify same or like components described above and any repetitive detailed description thereof will hereinafter be omitted or simplified in order to avoid complication.

A process 200 is used for communicating flagstick location. Process 200 includes a plurality of blocks 202-208, which can be performed manually and/or automatically, for free and/or for compensation, in realtime and/or in non-realtime, synchronous and/or asynchronous, serially and/or sequentially, by at least one entity, at least as described herein, in any manner.

Process 200 includes a plurality of blocks 202. Process 200 entails a selection of at least one of blocks 202 to perform. Blocks 202 include blocks 202A, 202B, 202C, 202D and 202E. Process 100 and/or process 200 can be performed via at least one of the golf player and the golf course operator in any manner, as described herein. Process 100 can include process 200. Note that process 200 can be employed for any static object and/or area on the golf course, such as a bunker, a water hazard, a tee position, and so forth. For example, the golf course operator can select a type of the static object and then perform at least some of process 200.

Block 202A entails placing the mobile device next to the flagstick. Such placement can be manual and/or automatic. Such placement can be in contact with the flagstick or not in contact with the flagstick, whether directly and/or indirectly in any manner. Also, such placement can be at any distance from the flagstick, such as any distance between about 0 feet and about 10 feet. Such placement can via the golf course operator. Such placement can involve the golf course operator standing over and/or adjacent to the hole with the mobile device to determine the the current geolocation of the mobile device.

Block 202B1 entails coupling a cradle to the mobile device. Such coupling can be performed in a direct manner, an indirect manner and/or any combination thereof. The cradle can be physically coupled via any port of the mobile device, such as a docking port, a charging port, a headphone jack port and so forth. The cradle can also be physically coupled via attaching to the mobile device without using any port of the mobile device, such as via wrapping the mobile device, magnetically attaching to the mobile device, adhesively attaching to the mobile device, hook-and-loop attaching to the mobile device, fastening to the device, mating with the device, snapping into the device, containing the mobile device, clamping to the mobile device, and so forth. The cradle can also be communicatively coupled to the mobile device in a wired and/or wireless manner in any way. The cradle can also be communicatively coupled to other devices and/or systems, such as a mobile device, a GPS network, a cellular network, an area network, including a local area network, a Wi-Fi network, and so forth. The cradle can be self-powered, such as via an internal battery, and/or powered and/or recharged via the mobile device, such as via wired means or via induction. The cradle can also be powered via a renewable energy source, whether solar powered, such as a solar cell, wind powered, such as a wind turbine, liquid powered, such as water turbine, and so forth. The cradle is operative under many weather and/or golf course conditions, such as being at least one of waterproof, windproof, golfball proof, shockproof, heatproof, lightning proof, snow-proof, theft-proof, and so forth.

Block 202B2 entails coupling the cradle to the flagstick, with the mobile device. Such coupling can be performed in a direct manner, an indirect manner and/or any combination thereof. The cradle can be physically coupled to any portion of the flagstick, such as a pole, a flag coupled to the pole and so forth. For example, the physical coupling can include at least one of wrapping around the pole, magnetically attaching to the pole, adhesively attaching to the pole, hook-and-loop attaching to the pole, fastening to the pole, mating with the pole, snapping into the pole, containing the pole, clamping to the pole, and so forth. Note that physical coupling can be via the flag as well in any manner, such as via fastening. The cradle can also be communicatively coupled to the flagstick in a wired and/or wireless manner in any way. The flagstick can also be communicatively coupled to other devices and/or systems, such as a mobile device, a GPS network, a cellular network, an area network, including a local area network, a Wi-Fi network, and so forth. The flagstick can be self-powered, such as via an internal battery, and/or powered and/or recharged via the cradle, such as via wired means or via induction. The flagstick can also be powered via a renewable energy source, whether solar powered, such as a solar cell, wind powered, such as a wind turbine, liquid powered, such as water turbine, and so forth. The flagstick is operative under many weather and/or golf course conditions, such as being at least one of waterproof, windproof, golfball proof, shockproof, heatproof, lightning proof, snow-proof, theft-proof, and so forth.

Block 202C1 entails coupling the cradle to the flagstick. Such coupling can be as described herein.

Block 202C2 entails docking the mobile device into the cradle. Such docking can be as described herein.

Block 202D1 entails coupling a geolocation device to the flagstick. Such coupling can be performed in a direct manner, an indirect manner and/or any combination thereof. The geolocation device can be encased for geolocation device protection. The geolocation device includes logic, whether hardware and/or software, enabling the geolocation device to determine its geolocation. The geolocation device can include a user interface, whether hardware and/or software based. For example, the geolocation device can include a GPS receiver, a signal triangulation geolocator, and so forth. The geolocation device can be physically coupled to any portion of the flagstick, such as a pole, a flag coupled to the pole and so forth. For example, the physical coupling can include at least one of wrapping around the pole, magnetically attaching to the pole, adhesively attaching to the pole, hook-and-loop attaching to the pole, fastening to the pole, mating with the pole, snapping into the pole, containing the pole, clipping onto the pole, clamping onto the pole, and so forth. Note that physical coupling can be via the flag as well in any manner, such as via fastening. The geolocation device can also be communicatively coupled to the flagstick in a wired and/or wireless manner in any way. The geolocation device can also be communicatively coupled to other devices and/or systems, such as a mobile device, a GPS network, a cellular network, an area network, including a local area network, a Wi-Fi network, and so forth. The geolocation device can be self-powered, such as via an internal battery, and/or powered and/or recharged via the flagstick, such as via wired means or via induction. The geolocation device can also be powered via a renewable energy source, whether solar powered, such as a solar cell, wind powered, such as a wind turbine, liquid powered, such as water turbine, and so forth. The geolocation device is operative under many weather and/or golf course conditions, such as being at least one of waterproof, windproof, golfball proof, shockproof, heatproof, lightning proof, snow-proof, theft-proof, and so forth.

Block 202D2 entails coupling the mobile device to the geolocation device. Such coupling can be performed in a direct manner, an indirect manner and/or any combination thereof. The geolocation device can be physically coupled via any port of the mobile device, such as a docking port, a charging port, a headphone jack port and so forth. The geolocation device can also be physically coupled via attaching to the mobile device without using any port of the mobile device, such as wrapping the mobile device, magnetically attaching to the mobile device, adhesively attaching to the mobile device, hook-and-loop attaching to the mobile device, fastening to the mobile device, mating with the mobile device, snapping into the mobile device, containing the mobile device, and so forth. The geolocation device can also be communicatively coupled to the mobile device in a wired and/or wireless manner in any way. The geolocation device can also be communicatively coupled to other devices and/or systems, such as a mobile device, a GPS network, a cellular network, an area network, including a local area network, a Wi-Fi network, and so forth. The geolocation device can be self-powered, such as via an internal battery, and/or powered and/or recharged via the mobile device, such as via wired means or via induction. The geolocation device can also be powered via a renewable energy source, whether solar powered, such as a solar cell, wind powered, such as a wind turbine, liquid powered, such as water turbine, and so forth. The geolocation device is operative under many weather and/or golf course conditions, such as being at least one of waterproof, windproof, golfball proof, shockproof, heatproof, lightning proof, snow-proof, theft-proof, and so forth.

Block 202E1 entails selecting a flagstick location on a golf course grid. The selecting involves operating a computer, such as a desktop computer, a laptop computer, a workstation computer, a terminal computer, a tablet computer, a mobile phone and so forth. The computer runs a software application providing a golf course grid. Alternatively, the software application can be web-based. Also alternatively, the selecting can be via a mobile app, a browser, part of an operating system, and so forth. Further alternatively, the selecting can be hardware based, such as via circuitry and mechanical objects and/or devices. The selecting can be via any input device, such as a keyboard, a mouse, a touchscreen, and so forth. The selecting manner can be of any type, such as any operation of a GUI element, like a button, a menu, a checkbox, and so forth. The selecting can include verifying and/or authenticating user and/or selection.

The grid can allow of any type of tiling, which can allow for identically sized and/or shaped tiles and/or non-identically sized and/or shaped tiles, in any manner. At least some of the tiling can be assigned unique coordinates for mapping. The coordinates can be of any type, such as longitude, latitude, alphanumeric, symbolic, pictographic, and so forth. At least some of the grid can cover at least a portion of the golf course. Alternatively, at least some of the grid can cover a plurality of golf courses. At least some of the grid can be abstract, general, granular, monochrome, grayscale, colorful, and so forth. At least some of the grid can allow for selecting other locations on the grid, whether golf based and/or non-golf based, whether golf course based and/or non-golf course based, such as a bunker location, a puffing green location, a restaurant proximal to the golf course, a bathroom on the golf course, a nearby parking lot, and so forth. At least some of the grid can include a legend. At least some of the grid can display other computing devices, such as golfer mobile devices, golf course staff devices, golf carts, and so forth, whether in realtime or not.

Block 202E2 entails saving the flagstick location. Such saving can be performed for any type of storage medium, such as memory, paper, and so forth. The medium can be local to and/or remote from the computer and/or location from where the selection was made. The saving can be based at least in part on manual input and/or automatic input. The saving can be in any format. The saving can be periodic.

Block 204 entails saving current location. The saving is via the mobile device. Such saving can be performed for any type of storage medium, such as memory, paper, and so forth. The medium can be local to and/or remote from the mobile device and/or location from where the selection was made. The saving can be based at least in part on manual input and/or automatic input. The saving can be in any format. The saving can be periodic. For example, the golf course operator can operate a mobile app on a mobile device to save the current location in memory of the mobile device for subsequent wireless communication.

Block 206 entails communicating with the computer system. Regardless of how the geolocation information for the flagstick is obtained, the geolocation information for the flagstick is communicated to the computer system. Such communication can be wired and/or wireless over any type of network in any manner. Such communication can be encrypted. The geolocation information for the flagstick can be communicated, such as via provision, offering, and/or presentation, in a format as originally received and/or identified. Alternatively, the geolocation information for the flagstick can be communicated, such as via provision, offering, and/or presentation, in the format not as originally received and/or identified. For example, the geolocation information for the flagstick can be amended for user comprehension, compatibility, security, compression, integrity, communication and so forth. Such amended geolocation information can be abridged, encrypted, compressed, rewritten, reformatted, outlined, symbolized and so forth. Such amendment can be performed via the mobile device.

Block 208 entails outputting flagstick geolocation information. The output can be to at least the mobile device. The output can be via provision, offering, and/or presentation, in a format as originally received and/or identified. Alternatively, the geolocation information for the flagstick can be output, such as via provision, offering, and/or presentation, in the format not as originally received and/or identified. For example, the geolocation information for the flagstick can be amended for user comprehension, compatibility, security, compression, integrity, communication and so forth. Such amended geolocation information can be abridged, encrypted, compressed, rewritten, reformatted, outlined, symbolized and so forth. Such amendment can be performed via the computer system.

The mobile device can communicate with the computer system, whether directly and/or indirectly in any manner. Such communication can be wired and/or wireless in any manner. The mobile device can include a cell phone, whether a feature phone or a smartphone, a tablet computer, a laptop computer, a computer terminal and so forth. Also, a vehicle, such as a golf cart or a flying drone, can be equipped with a computer thereby functioning as the mobile device. The mobile device functions based at least in part on logic, whether software and/or hardware based in any manner. The logic can include an operating system, a mobile software application, a web browser and so forth. The mobile software application can be available via an online app store, whether for free and/or for compensation, in any manner. Note that the mobile device can be operated via at least one of the golf player and the golf course operator. Also, note that the mobile device of block 202 can be identical to or different from the mobile device of block 208.

The output can be performed in multiple ways. The output can be performed based at least in part on any type of communication protocol, whether wired and/or wireless. The protocol can allow for availing via a cellular network, a Wi-Fi network, a short range wireless communication protocol, Ethernet, and so forth. The output can be via a message, such as an intra-app message, an email message, a fax message, a chat message, a text message, a browser message, a voicemail message, a web interface message, a social network message, and so forth. The output can include sharing and/or offering of any type. The output can include any form of access control granted to the mobile device to at least view at least a portion of the geolocation information for the flagstick. In some example embodiments, the output can include offering the geolocation information for the flagstick for viewing in order to copy and paste, whether manually and/or automatically, in any manner. Yet in other example embodiments, the output can include offering for downloading the geolocation information for the flagstick, whether manually and/or automatically, in any manner.

FIG. 3 shows an example embodiment of a flagstick according to the present disclosure. Some concepts depicted in this figure are described above. Thus, same reference characters identify same or like components described above and any repetitive detailed description thereof will hereinafter be omitted or simplified in order to avoid complication.

A flagstick 300 includes a flag 302 and a pole 304. Flag 302 is coupled, whether directly or indirectly, to pole 304. Such coupling can be of any type, such as fastening, attaching, snapping, stitching, joining, adhering, magnetically attracting, male-female mating, hook-and-loop fastening, hooking, and so forth. Flag 302 can be hoisted onto pole 304. Flag 304 can at least partially include any type of material, whether rigid, flexible, waterproof, synthetic, natural, reflective, luminescent, weatherproof, perforated, theft-proof and so forth. Flag 304 can be fully whole or have at least a hole therethrough. Flag 304 can have any color/visual pattern, any size, such as about 3 inches in length and about 1.5 inches in height, and/or shape, such as a polygon, an ellipse, and so forth.

Pole 304 is rectilinear. However, in other example embodiments, pole 304 can have any shape, such as curved, J-shaped, L-shaped, T-shaped, and so forth. Pole 304 can at least partially include any type of material, such as plastic, metal, wood, rubber, polymer, magnetic, and so forth. Pole 304 can be tapered in any manner. Pole 304 can be configured to fit into the hole cup. Pole 304 can be smooth, rough, rigid, flexible, electrically and/or thermally insulating, electrically and/or thermally conductive, weatherproof, golfball proof, theft-proof, and so forth. Pole 304 can be operative such that the cradle and/or the mobile device can be coupled thereto, whether concurrently and/or at different times. Such coupling can be performed in a direct manner, an indirect manner and/or any combination thereof. The cradle can be physically coupled to any portion of flagstick 300, such as pole 304, flag 302, and so forth. For example, the physical coupling can include at least one of wrapping around pole 304, magnetically adhering to pole 304, adhesively attaching to pole 304, hook-and-loop attaching to pole 304, fastening to pole 304, mating with pole 304, snapping into pole 304, containing pole 304, and so forth. Note that physical coupling can be via flag 302 as well in any manner, such as via fastening.

Flagstick 300 can include a processor, a memory in communication with the processor, a wired and/or wireless communication device, and so forth. The cradle can also be communicatively coupled to flagstick 300 in a wired and/or wireless manner in any way. Flagstick 300 can also be communicatively coupled to other devices and/or systems, such as a mobile device, a GPS network, a cellular network, an area network, including a local area network, a Wi-Fi network, and so forth. Flagstick 300 can be self-powered, such as via an internal battery, and/or powered and/or recharged via the cradle, such as via wired means or via induction. Flagstick 300 can also be powered via a renewable energy source, whether solar powered, such as a solar cell, wind powered, such as a wind turbine, liquid powered, such as water turbine, and so forth. Note that flagstick 300 can include its power source whether via flag 304, pole 304, and so forth. Flagstick 300 is operative under many weather and/or golf course conditions, such as being at least one of waterproof, windproof, golfball proof, shockproof, heatproof, lightning proof, snowproof, theft-proof, magnetic, and so forth.

FIG. 4 shows an example embodiment of a flagstick cradle according to the present disclosure. Some concepts depicted in this figure are described above. Thus, same reference characters identify same or like components described above and any repetitive detailed description thereof will hereinafter be omitted or simplified in order to avoid complication.

A flagstick cradle 400 includes a body 402 having a docking portion 404. Body 402 circumferentially surrounds pole 304. Note that body 402 can be of any shape and/or size. For example, body 402 can be ring shaped such that pole 304 fits therein or body 402 can include a plurality of arms that secure, clip, clamp and/or fasten to each other around pole 304 and/or secure, clip, clamp and/or fasten onto pole 304. Body 402 is linear. However, in other example embodiments, body 402 can have any shape, such as curved, wavy, zigzag, and so forth. Body 402 can be smooth, rough, rigid, flexible, electrically and/or thermally insulating, electrically and/or thermally conductive, weatherproof, golfball proof, theft-proof, magnetic, and so forth. Body 402 can at least partially include any type of material, such as plastic, metal, wood, rubber, polymer, magnetic, and so forth. Body 402 can be operative such that the cradle and/or the mobile device can be coupled thereto, whether concurrently and/or at different times. Such coupling can be performed in a direct manner, an indirect manner and/or any combination thereof.

Docking portion 404 is configured to receive the mobile device, depicted as a mobile phone 500, although other types of computing devices are possible as well. Note that phone 500 can be of any type, such as a feature phone, a smartphone, and so forth. Also note that phone 500 can run any type of operating system, whether device based, browser based, and so forth, in any manner. The docking can be direct and/or indirect, in any manner. The docking can be via any wired and/or wireless standard, in any manner. The docking can be via any type of port technology on docking portion 404 and phone 500. The docking can allow for recharging of cradle 400 via phone 500. Alternatively, the docking can allow for recharging of phone 500 via cradle 400. The docking can also allow for at least current geolocation data transfer from flagstick 300 onto phone 500. Such geolocation can be preprogrammed and/or remotely set into flagstick 300 or dynamically obtained via flagstick 300 communication with geolocation devices and/or networks, in any manner. Alternatively, the current geolocation data can be transferred from phone 500 onto flagstick 300 for subsequent communication from flagstick 300 to the computer system. Alternatively, docking portion 400 can just provide stand support to phone 500. Note that in some example embodiments that cradle 400 can be secured onto any portion of flagstick 300, such as pole 304.

FIG. 5 shows an example embodiment of a mobile device cradle according to the present disclosure. Some concepts depicted in this figure are described above. Thus, same reference characters identify same or like components described above and any repetitive detailed description thereof will hereinafter be omitted or simplified in order to avoid complication.

Cradle 400 is coupled to phone 500. Such coupling is via cradle 400 connecting via a docking/recharging port of phone 500. Also, such coupling entails wired communication between cradle 400 and phone 500. However, such coupling can also lack wired communication and instead contain wireless communication, such as short range wireless communication. Phone 500 powers cradle 400. Phone 500 can retrieve data from cradle 400, such as flagstick geolocation data. Alternatively, cradle 400 can retrieve data from phone 500, such current geolocation of phone 500, for subsequent communication to the computer system. Also note that in some example embodiments, cradle 400 is incorporated into phone 500, whether internally and/or externally, such that phone 500 and cradle 400 are one device.

Figure 6:
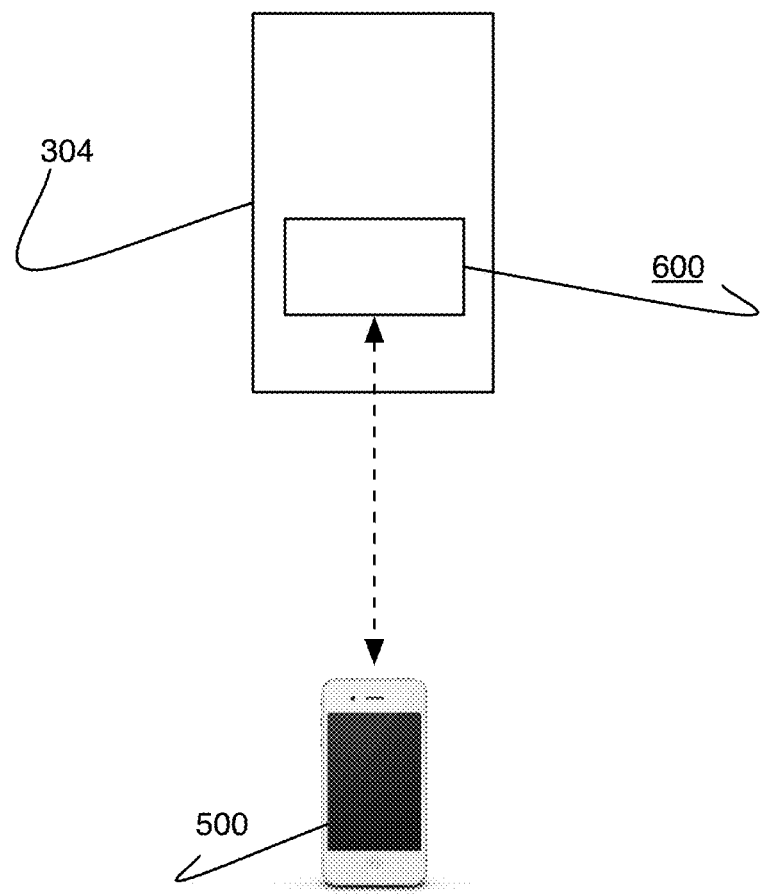
FIG. 6 shows an example embodiment of a geolocation device according to the present disclosure.

FIG. 6 shows an example embodiment of a geolocation device according to the present disclosure. Some concepts depicted in this figure are described above. Thus, same reference characters identify same or like components described above and any repetitive detailed description thereof will hereinafter be omitted or simplified in order to avoid complication.

A geolocation device 600 is coupled to flagstick 300, such as via pole 304. Such coupling can be performed in a direct manner, an indirect manner and/or any combination thereof. Geolocation device 600 can be encased for geolocation device protection. Geolocation device 600 includes logic, whether hardware and/or software, enabling geolocation device 600 to determine its geolocation. Geolocation device 600 can include a user interface, whether hardware and/or software based. For example, geolocation device 600 can include a GPS receiver, a signal triangulation geolocator, and so forth.

Geolocation device 600 can be physically coupled to any portion of flagstick 300, such as pole 304. For example, the physical coupling can include at least one of wrapping around pole 304, magnetically attaching to pole 304, adhesively attaching to pole 304, hook-and-loop attaching to pole 304, fastening to pole 304, mating with pole 304, snapping into pole 304, containing pole 304, and so forth. Note that physical coupling can be via flag 302 as well in any manner, such as via fastening.

Geolocation device 600 can also be communicatively coupled to flagstick 300 in a wired and/or wireless manner, in any way. Geolocation device 600 can also be communicatively coupled to other devices and/or systems, such as a mobile device, a GPS network, a cellular network, an area network, including a local area network, a Wi-Fi network, and so forth. Geolocation device 600 can be self-powered, such as via an internal battery, and/or powered and/or recharged via the flagstick, such as via wired means or via induction. Geolocation device 600 can also be powered via a renewable energy source, whether solar powered, such as a solar cell, wind powered, such as a wind turbine, liquid powered, such as water turbine, and so forth. Geolocation device 600 is operative under many weather and/or golf course conditions, such as being at least one of waterproof, windproof, golfball proof, shockproof, heatproof, lightning proof, snow-proof, theft-proof, and so forth.

Phone 500 is coupled to geolocation device 600. Such coupling can be performed in a direct manner, an indirect manner and/or any combination thereof. Geolocation device 600 can be physically coupled via any port of phone 500, such as a docking port, a charging port, a headphone jack port, and so forth. Geolocation device 600 can also be physically coupled via attaching to phone 500 without using any port of phone 500, such as wrapping phone 500, magnetically attaching to phone 500, adhesively attaching to phone 500, hook-and-loop attaching to phone 500, fastening to phone 500, mating with phone 500, snapping into phone 500, containing phone 500, and so forth. Geolocation device 600 can also be communicatively coupled to phone 500 in a wired and/or wireless manner in any way, whether local or remote.

Figure 7:
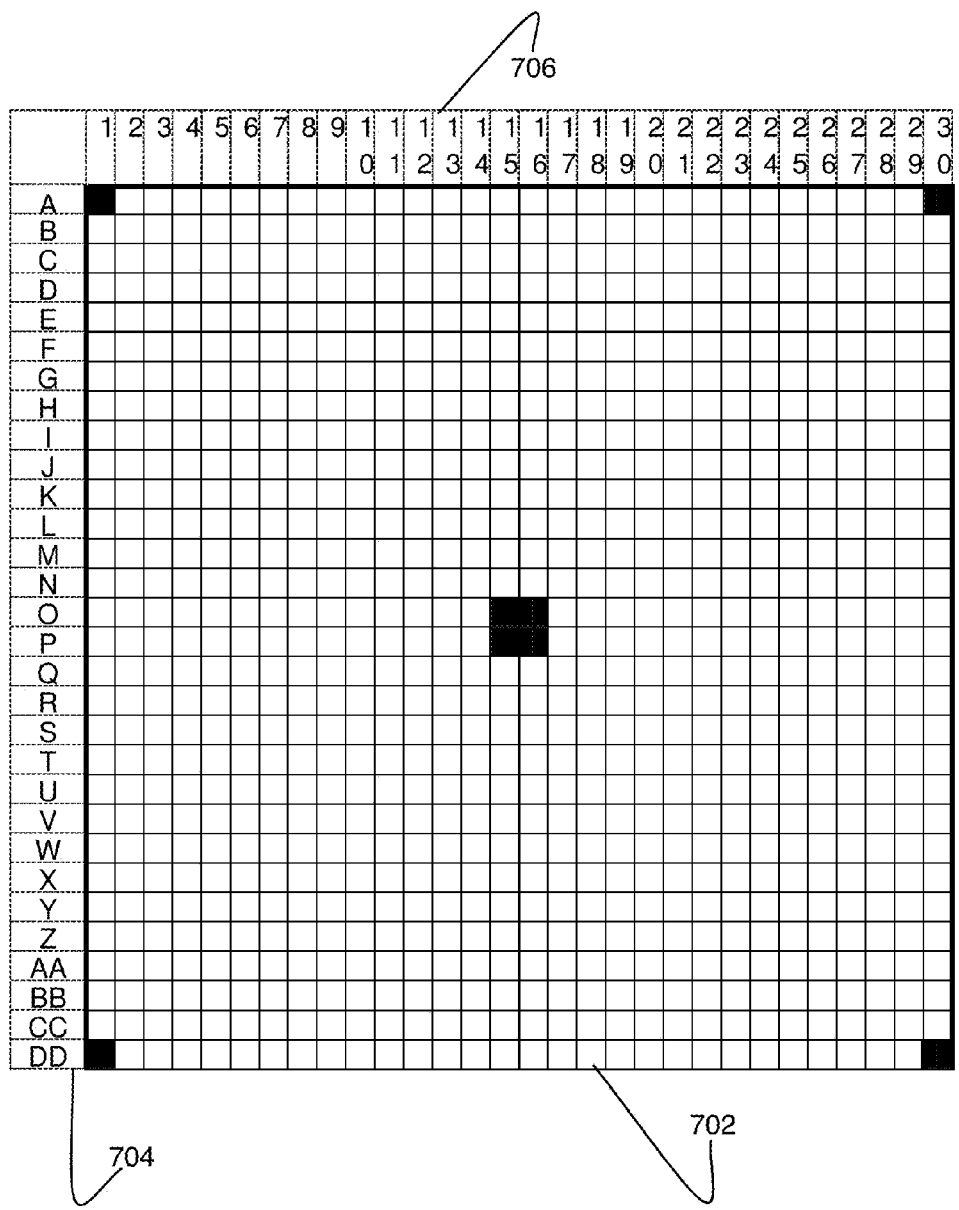
FIG. 7 shows an example embodiment of a golf course grid according to the present disclosure.

FIG. 7 shows an example embodiment of a golf course grid according to the present disclosure. Some concepts depicted in this figure are described above. Thus, same reference characters identify same or like components described above and any repetitive detailed description thereof will hereinafter be omitted or simplified in order to avoid complication.

A golf course grid 700 includes a plurality of tiles 702, which can be identically sized and/or shaped and/or non-identically sized and/or shaped, in any manner. Grid 700 can have any shape, such as a polygon, an ellipse, and so forth. Grid 700 can be symmetrically shaped and asymmetrically shaped. Grid 700 is navigable via a coordinate system having a numerical component 706 on an X-axis and an alphabetical component 704 on a Y-axis. Component 706 and component 704 can also include identical values, such as component 706 and component 704 being alphanumerically based. However, note that any type of coordinate system can be used, such as longitude, latitude, alphanumeric, symbolic, pictographic, and so forth. Grid 700 can contain any number of even or odd tiles 702. Grid 700 contains a grid center contained four immediately adjacent black tiles 702 to form a square pattern. Note that the grid center can be any number of tiles 702, such as one tile 702, five tiles 702, and so forth, of any color or visual distinction, if any. The grid center tiles can be identically and/or non-identically sized, shaped and/or colored in any manner. The grid center can be of any shape, such as a polygon, an ellipse, and so forth. The grid center can include any even or odd number of tiles 702. The grid center can also be off center. Also note that grid 700 includes four corner black tiles, which can be of any color for visual distinction, if any. Grid 700 can include any number of corners. The grid center can represent anything, such as a golf course main building, a clubhouse or some other structure, device or vehicle.

At least some of grid 700 can cover at least a portion of the golf course. Alternatively, at least some of grid 700 can cover a plurality of golf courses. At least some of grid 700 can be abstract, general, granular, monochrome, grayscale, colorful, and so forth. At least some of grid 700 can allow for selecting other locations on grid 700, whether golf based and/or non-golf based, whether golf course based and/or non-golf course based, such as a bunker location, a puffing green location, a restaurant proximal to the golf course, a bathroom on the golf course, a nearby parking lot, and so forth. At least some of grid 700 can include a legend. At least some of grid 700 can display other computing devices, such as golfer mobile devices, golf course staff devices, golf carts, and so forth.

When a flagstick location is selected on grid 700, such location can be saved for any type of storage medium, such as memory, paper, and so forth. The medium can be local to and/or remote from the computer and/or location from where the selection was made. The saving can be based at least in part on manual input and/or automatic input. The saving can be in any format. The saving can be periodic. Grid 700 is displayable via a computer, such as via a software application, operating system, a mobile app, a browser, a web portal, and so forth. Further alternatively, the selecting can be hardware based, such as via circuitry and mechanical objects and/or devices. The selecting can be via any input device, such as a keyboard, a mouse, a touchscreen, a microphone, and so forth. The selecting manner can be of any type, such as any operation of a GUI element, like a button, a menu, a checkbox, and so forth. The selecting can include verifying and/or authenticating user and/or selection.

Figure 8:
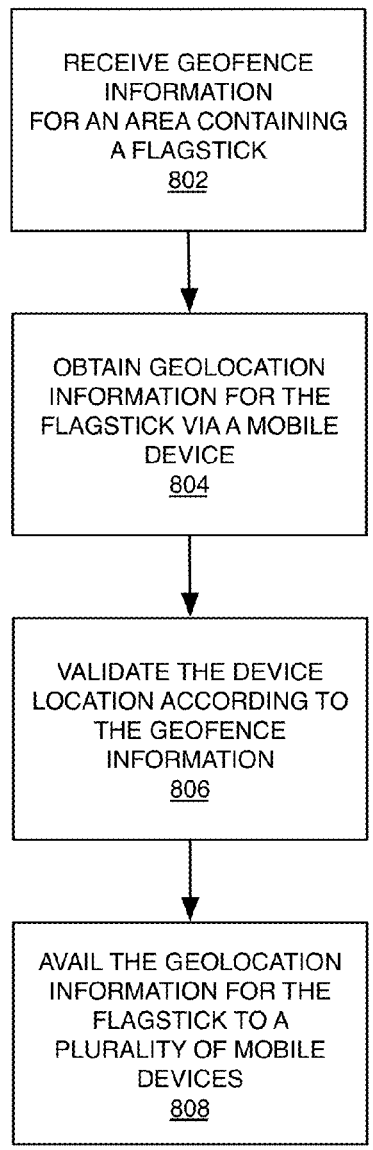
FIG. 8 shows a flowchart of an example embodiment of a geofence validation process according to the present disclosure.

FIG. 8 shows a flowchart of an example embodiment of a geofence validation process according to the present disclosure. Some concepts depicted in this figure are described above. Thus, same reference characters identify same or like components described above and any repetitive detailed description thereof will hereinafter be omitted or simplified in order to avoid complication.

A process 800 is used for geofence validation. Process 800 includes a plurality of blocks 802-808, which can be performed manually and/or automatically, for free and/or for compensation, in realtime and/or in non-realtime, synchronous and/or asynchronous, serially and/or sequentially, by at least one entity, at least as described herein, in any manner.

Block 802 entails receiving geofence information for an area containing the flagstick. The geofence information includes data, which enables identifying of a geofence for the area containing the flagstick. The golf course includes the area. For example, the geofence information can include a plurality of coordinates, such as at least one of longitude and latitude, whether the coordinate is global system based and/or specific area system based. The area can include any area of the golf course, such as a puffing green of any shape and/or size. Note that any number of geofences can be used whether for the golf course and/or for the area.

The receiving is performed based at least in part on identifying the geofence information via a computer and communicating the identified geofence information via the computer, for receipt via the computer system. The computer can communicate with the computer system, whether directly and/or indirectly in any manner. Such communication can be wired and/or wireless in any manner. The computer can include a desktop computer, a cell phone, whether feature phone or a smartphone, a tablet computer, a laptop computer, a computer terminal, a computer workstation, and so forth. Also, a vehicle, such as a golf cart or a flying drone, can be equipped with a computer thereby functioning as the computer. The computer functions based at least in part on logic, whether software and/or hardware based in any manner. The logic can include an operating system, a mobile software application, a web browser and so forth. The mobile software application can be available via an online app store, whether for free and/or for compensation, in any manner. Note that the computer can be encased in a case for computer protection.

The identifying is performed via the golf course operator, who can operate the computer, whether directly and/or indirectly, whether wired and/wirelessly, whether personally and/or impersonally, manually and/or automatically, in any manner. For example, the identifying can include manually setting geofence points and/or drawing a geofence around the area as displayed on a map or a grid, and communicating the geofence information to the computer system. Further, note that in some example embodiments computer vision can be used. For example, a computer vision software logic can be employed with a map, whether real and/or virtual, to detect patterns on the map meeting predetermined criteria, such as a puffing green, a bunker, and so forth. Also, note that in some example embodiments, the identifying and the communicating can be performed via the golf player. Additionally, note that in some example embodiments, the geofence information can be manually input into the computer and communicated to the computer system.

Block 804 entails obtaining the geolocation information for the flagstick via the mobile device. Such obtaining can be performed as described herein, such as via process 100 and/or 200.

Block 806 entails validating the device location according to the geofence information. Such validating involves determining whether the mobile device, when saving the current geolocation information, is located within the geofence as defined via the geofence information. If yes, then the geolocation information for the flagstick is used for subsequent communicative output, without flagging. If not, then the geolocation information for the flagstick can still be used, but is flagged for validation failure. For example, such flagging can be used for subsequent at least one of communicative output with an explanation/disclaimer, operator deletion, sender notification, operator modification, and storing for further operator review/examination/analysis. Such determination effectively reduces presence of false and/or inaccurate geolocation information for the flagstick. For example, when the user is effectively unable to self-identify via the mobile device of the user's current geolocation and/or the mobile device improperly determines and/or is unable to determine its current self-position, such as under weather conditions hampering communication with the GPS system or the cellular network for signal triangulation.

Block 808 entails availing the geolocation information for the flagstick to a plurality of mobile devices, such as via process 100 and/or process 200.

Figure 9:
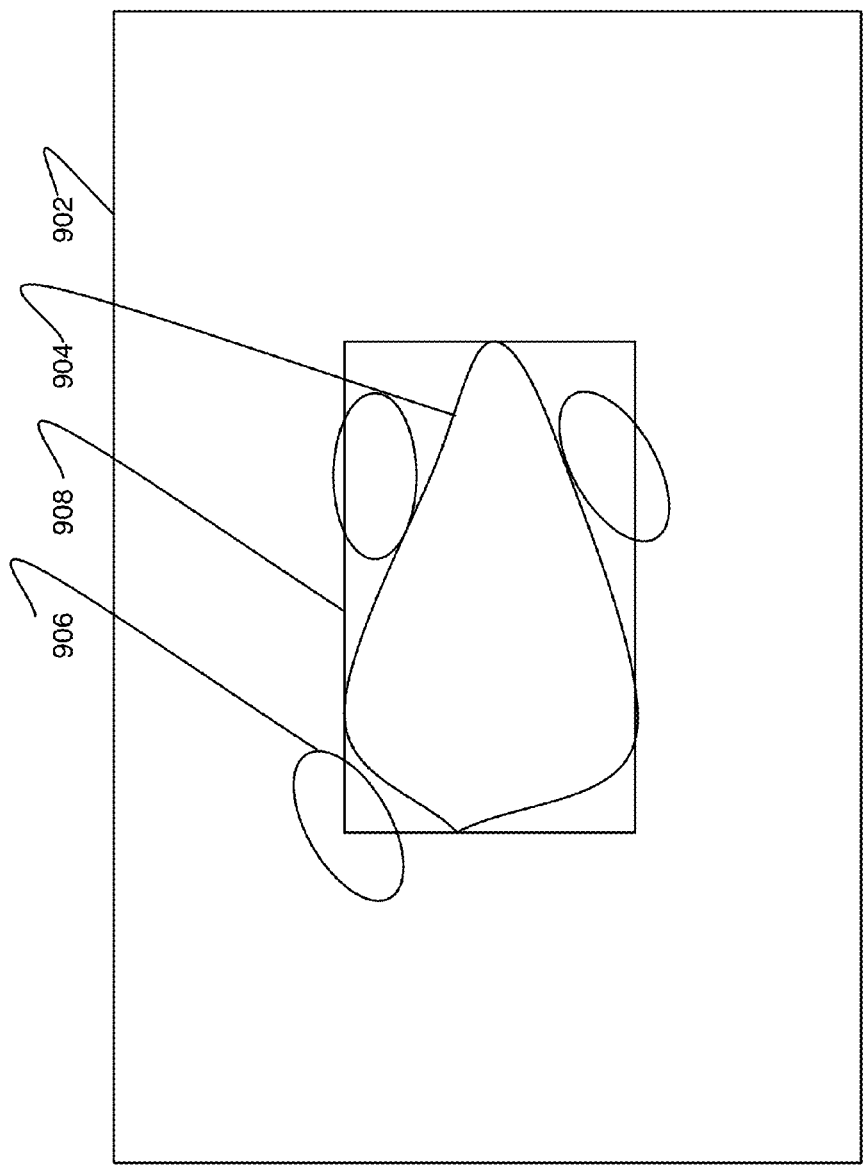
FIG. 9 is a diagram of an example embodiment of a geofenced puffing green on a golf course according to the present disclosure.

FIG. 9 is a diagram of an example embodiment of a geofenced puffing green on a golf course according to the present disclosure. Some concepts depicted in this figure are described above. Thus, same reference characters identify same or like components described above and any repetitive detailed description thereof will hereinafter be omitted or simplified in order to avoid complication.

An area 900 of the golf course is shown. Area 900 can fully contain the entire golf course or a portion thereof. Area 900 contains a fairway portion 902, a puffing green 904, a plurality of bunkers 906, and a geofence 908, which can be generated and/or used, as described with reference to process 800. Note that geofence 908 substantially encloses puffing green 904. Such enclosure can be accomplished manually and/or automatically, in any manner as described herein. For example, a software application with computer vision is used to process a map of the golf course containing area 900. The software application determines a presence of puffing green 904 within area 900 adjacent to fairway 902. The software application automatically generates geofence 908 around puffing green 904. Note that although geofence 908 does not correspond to the shape of puffing green 904, in another example embodiment, geofence 908 can correspond to the shape of puffing green 904. Such correspondence can be external to, internal to, or overlaying puffing green 904.

Figure 10:
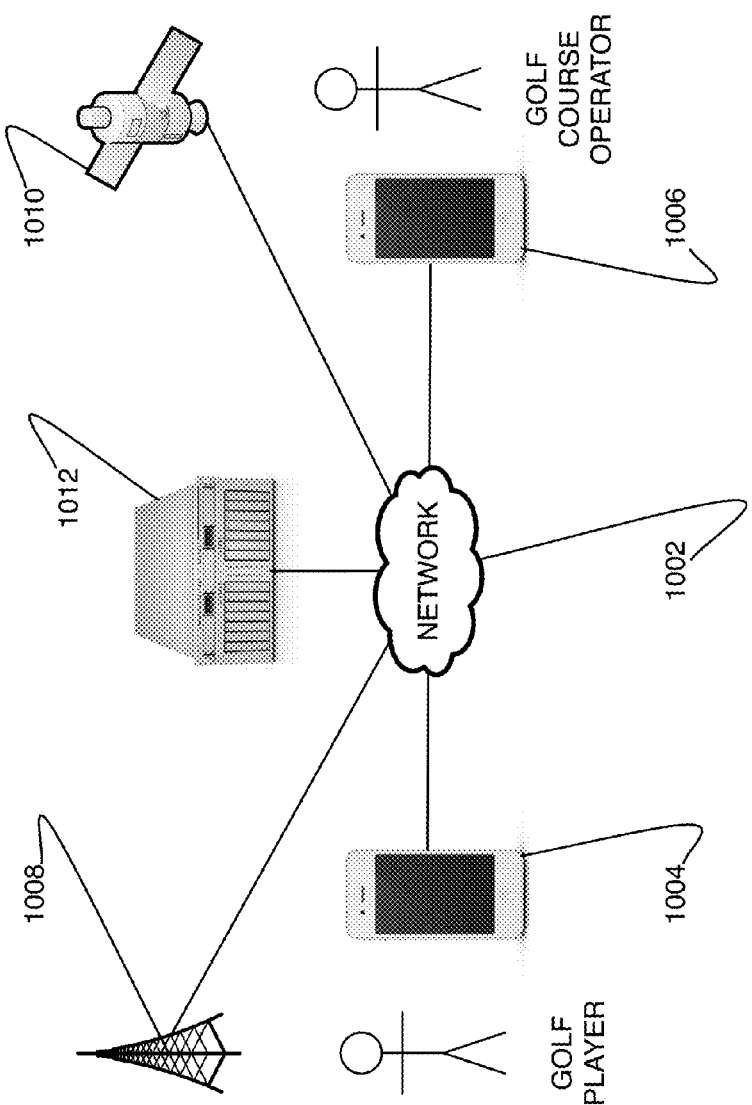
FIG. 10 is a diagram of an example embodiment of a communication diagram for flagstick distance determination according to the present disclosure.

FIG. 10 is a diagram of an example embodiment of a communication diagram for flagstick distance determination according to the present disclosure. Some concepts depicted in this figure are described above. Thus, same reference characters identify same or like components described above and any repetitive detailed description thereof will hereinafter be omitted or simplified in order to avoid complication.

A communication diagram 1000 depicts a network 1002, a mobile device 1004, a mobile device 1006, a cellular site 1008, a satellite 1010 and a computer system 1012. Although FIG. 10 shows one network, a pair of mobile devices, one cellular site, one satellite and one computer system, any number of networks, mobile devices, cellular sites, satellites, and/or computer systems can be used in any type of correspondence, such as one-to-one, one-to-many, many-to-one and/or many-to-many, in any way according to the principles of the present disclosure. Any and/or all communications between any of such technologies can be selectively and/or unselectively, directly and/or indirectly, encrypted, unencrypted and/or or any combinations thereof.

Network 1002 includes a collection of computers and/or other hardware interconnected by communication channels that allow for sharing of resources and/or information. Network 1002 can include wired and/or wireless communications. Network 1002 can allow for communication over short and/or long distances. Network 1002 can operate via one and/or more network protocols, such as Ethernet, TCP/IP, SONET/SDH and/or Asynchronous Transfer Mode. Network 1002 can have any scale, such as a personal area network, a local area network, a home area network, a storage area network, a campus area network, a backbone network, a metropolitan area network, a wide area network, an enterprise private network, a virtual private network, a virtual network, a satellite network, a computer cloud network, an internetwork and/or a cellular network. Network 1002 can include an intranet and/or an extranet. Network 1002 can include Internet. Network 102 can include and/or allow for communication with other networks, whether identical and/or different from network 1002. Network 1002 can include hardware, such as a network interface card, a repeater, a hub, a bridge, a switch and/or a firewall. Network 1002 can be operated, directly and/or indirectly, by and/or on behalf of one and/or more entities, irrespective of any relation to depicted technologies and/or the present disclosure.

Mobile device 1004 is operated, directly and/or indirectly, by and/or on behalf of the golf player. Note that although mobile device 1004 is used, any type of a computer, whether stationary and/or mobile, whether touchscreen and/or non-touchscreen, can be used. Some examples of such computer can include a desktop computer, a laptop computer, a tablet computer and/or others. Mobile device 1004 can include and/or be part of another computer system and/or cloud network. Mobile device 1004 can run any type of operating system, such as iOS®, Windows®, Android®, Unix®, Linux® or others. Mobile device 1004 can include and/or be coupled to an input device, such as a mouse, a keyboard, a camera, an accelerometer and/or a microphone, and/or an output device, such as a display, a speaker and/or a printer. Mobile device 1004 can communicate in a wired and/or wireless manner in any way, whether directly and/or indirectly. Mobile device 1004 is in communication with network 1002. Mobile device 1004 can communicate with computer system 1012 via network 1002. Such communication can be via a mobile app running on mobile device 1004, a browser running on mobile device 1004 and/or any combination thereof. Mobile device 1004 can include circuitry for global positioning determination. Mobile device 1004 can be equipped with near-field-communication (NFC) circuitry. Mobile device 1004 can communicate with mobile device 1006, site 1008 and satellite 1010, whether directly and/or indirectly, wired and/or wireless, in any manner.

Mobile device 1006 is operated, directly and/or indirectly, by and/or on behalf of the golf course operator. Note that although mobile device 1006 is used, any type of a computer, whether stationary and/or mobile, whether touchscreen and/or non-touchscreen, can be used. Some examples of such computer can include a desktop computer, a laptop computer, a tablet computer and/or others. Mobile device 1006 can include and/or be part of another computer system and/or cloud network. Mobile device 1006 can run any type of operating system, such as iOS®, Windows®, Android®, Unix®, Linux® or others. Mobile device 1006 can include and/or be coupled to an input device, such as a mouse, a keyboard, a camera, an accelerometer and/or a microphone, and/or an output device, such as a display, a speaker and/or a printer. Mobile device 1006 can communicate in a wired and/or wireless manner in any way, whether directly and/or indirectly. Mobile device 1006 is in communication with network 1002. Mobile device 1006 can communicate with computer system 1012 via network 1002. Such communication can be via a mobile app running on mobile device 1006, a browser running on mobile device 1006 and/or any combination thereof. Mobile device 1006 can include circuitry for global positioning determination. Mobile device 1006 can be equipped with NFC circuitry. Mobile device 1006 can communicate with mobile device 1004, site 1008 and satellite 1010, whether directly and/or indirectly, wired and/or wireless, in any manner.

Computer system 1012 includes at least one computer server, whether hardware and/or software based, which can be in communication with a database, such as a relational database. Computer system 1012 can be operated directly and/or indirectly by and/or on behalf of one and/or more entities, such as the golf course operator, the golf player, and so forth, in any combination thereof. For example, the golf course operator can operate computer system 1012, whether directly, such as via its own and/or hired information technology (IT) specialist, and/or indirectly, such as via outsourcing to a third party, irrespective of any relationship to the golf course operator, whether for compensation, for no compensation and/or any combination thereof. Computer system 1012 can be operated as a service, including as a paid service, such as via the golf course operator and/or a third party, whether directly and/or indirectly, in any manner, for use by a plurality of golf courses. The golf course operator can have computer system 1012 running on premises and/or the golf course operator can have computer system 1012 running off premises of the golf course operator.

Computer system 1012 is in communication with network 1002. Computer system 1012 can be mobile and/or stationary. Computer system 1012 can be and/or can include a touchscreen and/or a non-touchscreen. Computer system 1012 can include and/or be part of another computer system and/or cloud network. Computer system 1012 can be a mainframe computer and/or computer system. Computer system 1012 can run any type of operating system, such as iOS®, Windows®, Android®, Unix®, Linux® or others. Computer system 1012 can include and/or be coupled to and/or include an input device, such as a mouse, keyboard and/or a microphone, and/or output device, such as a display, a speaker and/or a printer. Computer system 1012 is operative to run software at least facilitating flagstick distance determination. Such software can interface with software running on mobile device 1004 and mobile device 1006. The software can provide different types of access based on user type, such as the golf player, the golf course operator, and so forth. Such software can be provided in a software as a service (SAAS) business model, such as in a cloud.

Satellite 1010 can be operated directly and/or indirectly by and/or on behalf of one and/or more entities, such as a telecommunications company, in any combination thereof. Satellite 1010 is in communication with network 1002. Satellite 1010 can allow for network communications between computer system 1012 and mobile device 1004 and/or mobile device 1006. Satellite 1010 can allow for determining geo-location of mobile device 1004, mobile device 1006 and/or computer system 1012 via the GPS system or signal triangulation.

Site 1008 can be operated directly and/or indirectly by and/or on behalf of one and/or more entities, such as a telecommunications company, in any combination thereof. Site 1008 is in communication with network 1002. Site 1008 can allow for network communications between computer system 1012 and mobile device 1004 and mobile device 1006. Site 1008 can allow for determining geo-location of mobile device 1004, mobile device 1006 and/or computer system 1012 via signal triangulation.

In one example mode of operation, computer system 1012 is used via the golf course operator and the golf player. The golf course operator uses mobile device 1006 running a golf course operator software application. The golf player uses mobile device 1004 running a golf player software application, which can be different from the golf course software application or be identical to the golf course software application but provide a different interface based on the golf player login. The golf course application and the golf player application communicate with computer system 1012 over network 102. When the golf course operator plants a flagstick in the golf course, the golf course operator starts the golf course operator application on mobile device 1006. The golf course operator application utilizes geo-location technology via satellite 1010. The golf course operator application obtains the current geolocation via satellite 1010 and associates the current geolocation with the planted flagstick. Such process can be repeated for many flagsticks. The associated information is sent to computer system 1012 via site 1008 over network 1002. Such sending can be done upon each planting of the flagstick or after all the flagsticks are placed. Regardless, computer system 1012 stores the received geolocation information, such as longitude and latitude, of each planted flagstick. When the golf player goes golfing, the golf player runs the golf player application on mobile device 1004 to access computer system 1012. The golf player application utilizes geolocation technology via satellite 1010 to determines the golf player's current geolocation via mobile device 1004. The golf player can then select a specific hole or the golf player application automatically determines the nearest hole. Regardless, the golf player application retrieves the geolocation of a certain flagstick based on user selection of the hole or automatic determination of the nearest hole. The golf player application then calculates the distance between the golf player and the flagstick based on the geolocation information retrieved from computer system 1012. Such calculated distance is output via the golf player application running on mobile device 1004. Based on the determined distance, the golf player application can also suggest a proper club/ball to use, how to swing, what posture to stand in, wind conditions, what direction to hit and other golf player related information. Such technology can be monetized via golf course operators paying to use computer system 1012, charging for the golfer application, or showing golf player related ads via the golf player application based on the distance. Note that in some example embodiments, the golf player application and the golf course operator application can be one software application that functions in an operator mode or a golf player mode based on user login and/or user location. However, the golf player application and the golf course operator application can be different applications. Further note, that the golf player and/or the golf course application can disclose golf hole information, hole distance information, signal accuracy information, hole accuracy information, last update information, current geolocation information, and so forth. Further note that in some example embodiments, the golf player application and the golf course operator application can communicate with each other, not communicate with each other, and so forth. Also, note that in some example embodiments, the golf player can communicate with others, such as golf players and/or non-golf players, via the golf player application. Such communication can include social network communication, email communication, text message communication, and so forth. Similarly, the golf course operator can communicate with others, such as golf course operators, various employees, staff, golf players, and/or non-golf players, via the golf course operator application. Such communication can include social network communication, email communication, text message communication, and so forth.

Note in some example embodiments, the present disclosure can be used with any number of flagsticks in any number of locations in any number of golf courses with or without golf carts. Further note that the present disclosure can be used with any number of devices receiving flagstick geolocation information at anytime under any weather conditions. Also note that in some example embodiments specialized golf devices can also be configured to retrieve flagstick geolocation information. Moreover note that in some example embodiments other business entities with specialized golf equipment/devices can subscribe to receive flagstick geolocation information, such as for a fee and/or a barter exchange. Additionally note that in some example embodiments the flagstick geolocation information can be provided to golf club members and/or resold to others and/or provided access to others. Furthermore note that in some example embodiments, computer system 1012 can allow for other to access the geolocation information and/or modify the geolocation information wiki-style. Also note that in some example embodiments the present disclosure can speed up game play and allow for ordering based at least in part on proximity as determined via the determined distance and/or the golf player's current location. More note that in some example embodiments the the golf players may not have to download the flagstick geolocation information manually, but instead have the flagstick geolocation information pushed onto their mobile devices automatically for golf courses on which the golf players play often or using a subscription model.

Note that computing connections, as described herein, can include all direct and/or indirect types of communicative communication, whether wired, wirelessly, over a network, via a bus or any other computing structure. Also, connecting elements can permit for indirect connection. Further, note that communications as described herein can include unidirectional communication, bidirectional communication, multi-directional communication, and so forth.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of programming languages include HTML5, Flash and other similar languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams, as disclosed herein, illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated. The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure. While the preferred embodiment to the disclosure had been described, skilled artisans, both now and in the future, may make various improvements and/or enhancements which fall within the scope of the claims which follow. These claims should be construed to maintain the proper protection for the disclosure first described.

What is claimed is:

1. A system comprising:
   a golf course operator mobile computing device located within a golf course, said operator device obtaining a geolocation for a flagstick positioned for golf gameplay within said course;
   a computer system receiving said flagstick geolocation from said operator device; and
   a golfer mobile computing device locating within said course, said golfer device obtaining a golfer device current geolocation, said golfer device receiving said flagstick geolocation from said computer system, said golfer device determining a distance between said golfer device and said flagstick based on said golfer device current geolocation and said flagstick geolocation, said golfer device disclosing said distance;
   wherein said operator device obtaining said flagstick geolocation via being adjacent to said flagstick, obtaining an operator device current geolocation, and associating said operator device current geolocation with said flagstick; and wherein said operator device obtaining geofence information for an area of said course containing said flagstick, validating said operator device current geolocation within said area based on said geofence information, flagging said flagstick geolocation for subsequent action based on said validating being unsuccessful, and communicating said flagged flagstick geolocation to said computer system.

2. A system comprising:
a golf course operator mobile computing device located within a golf course, said operator device obtaining a geolocation for a flagstick positioned for golf gameplay within said course;
a computer system receiving said flagstick geolocation from said operator device; and
a golfer mobile computing device locating within said course, said golfer device obtaining a golfer device current geolocation, said golfer device receiving said flagstick geolocation from said computer system, said golfer device determining a distance between said golfer device and said flagstick based on said golfer device current geolocation and said flagstick geolocation, said golfer device disclosing said distance; and
wherein said operator device obtaining said flagstick geolocation via displaying a golf course tiled grid, receiving a user input corresponding to a tile on said grid with said tile being associated with a predetermined geolocation, and associating said predetermined geolocation with said flagstick.

3. The system of claim 2, wherein said grid displaying a plurality of icons corresponding to a plurality of mobile computing devices within said course in realtime, said devices associated with golf gameplay within said course.

4. The system of claim 2, wherein said computer system is remote from said course.

5. The system of claim 2, wherein each of said operator device and said golfer device operate a software application providing at least one of a golf operator interface and a golfer interface based on a user login.

6. The system of claim 2, wherein said golfer device receiving said flagstick geolocation from said system based on at least one of a manual golf hole selection and an automatic golf hole selection based on said golfer device geolocation.

7. The system of claim 2, wherein said golfer device suggesting golf gameplay assistive information based on said distance.

8. The system of claim 2, wherein said golfer device displaying an advertisement based on said distance.

9. A method comprising:
within a golf course:
obtaining a geolocation for a flagstick positioned for golf gameplay within said course via a golf course operator mobile computing device;
sending said flagstick geolocation from said operator device to a computer system;
facilitating a golfer mobile computing device to obtain a golfer device current geolocation, to receive said flagstick geolocation from said system, to determine a distance between said golfer device and said flagstick based on said golfer device current geolocation and said flagstick geolocation, and to disclose said distance;
wherein said obtaining said flagstick geolocation is via said operator device being adjacent to said flagstick, said operator device obtaining an operator device current geolocation, and said operator device associating said operator device current geolocation with said flagstick.

10. A method comprising:
within a golf course:
obtaining a geolocation for a flagstick positioned for golf gameplay within said course via a golf course operator mobile computing device;
sending said flagstick geolocation from said operator device to a computer system;
facilitating a golfer mobile computing device to obtain a golfer device current geolocation, to receive said flagstick geolocation from said system, to determine a distance between said golfer device and said flagstick based on said golfer device current geolocation and said flagstick geolocation, and to disclose said distance;
obtaining geofence information for an area of said course containing said flagstick via said operator device;
validating said operator device current geolocation for presence in said area based on said geofence information via said operator device;
flagging said flagstick geolocation for subsequent action based on said validating being unsuccessful via said operator device; and
communicating said flagged flagstick geolocation to said computer system via said operator device.

11. A method comprising:
within a golf course:
obtaining a geolocation for a flagstick positioned for golf gameplay within said course via a golf course operator mobile computing device;
sending said flagstick geolocation from said operator device to a computer system;
facilitating a golfer mobile computing device to obtain a golfer device current geolocation, to receive said flagstick geolocation from said system, to determine a distance between said golfer device and said flagstick based on said golfer device current geolocation and said flagstick geolocation, and to disclose said distance; and
wherein said obtaining said flagstick geolocation is via said operator device displaying a golf course tiled grid, receiving a user input corresponding to a tile on said grid with said tile being associated with a predetermined geolocation, and associating said predetermined geolocation with said flagstick.

12. The method of claim 11, wherein said grid displaying a plurality of icons corresponding to a plurality of mobile computing devices within said course in realtime, said devices associated with golf gameplay within said course.

13. A method comprising:
within a golf course:
obtaining a geolocation for a flagstick positioned for golf gameplay within said course via a golf course operator mobile computing device;
sending said flagstick geolocation from said operator device to a computer system;
facilitating a golfer mobile computing device to obtain a golfer device current geolocation, to receive said flagstick geolocation from said system, to determine a distance between said golfer device and said flagstick based on said golfer device current geolocation and said flagstick geolocation, and to disclose said distance;

wherein said golfer device receiving said flagstick geolocation from said system based on at least one of a manual golf hole selection and an automatic golf hole selection based on said golfer device geolocation;

wherein said golfer device suggesting golf gameplay assistive information based on said distance; and wherein said golfer device displaying an advertisement based on said distance.

\* \* \* \* \*